United States Patent
Manes

(10) Patent No.: US 9,044,864 B2
(45) Date of Patent: Jun. 2, 2015

(54) WRIST LOCK FOR A STORAGE LIBRARY

(75) Inventor: Joseph Paul Manes, Arvada, CO (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 598 days.

(21) Appl. No.: 13/424,175

(22) Filed: Mar. 19, 2012

(65) Prior Publication Data

US 2013/0239736 A1 Sep. 19, 2013

(51) Int. Cl.
- *B25J 17/00* (2006.01)
- *B25J 15/00* (2006.01)
- *B25J 17/02* (2006.01)

(52) U.S. Cl.
CPC ............ *B25J 15/00* (2013.01); *Y10T 74/20335* (2015.01); *B25J 17/02* (2013.01)

(58) Field of Classification Search
CPC .............. B25J 9/02; B25J 9/023; B25J 17/02; B25J 15/00
USPC ............................ 74/490.01, 490.04–490.06; 414/744.1–744.5, 744.7, 744.8; 901/14–16, 28, 29
See application file for complete search history.

(56) References Cited

U.S. PATENT DOCUMENTS

| | | | | |
|---|---|---|---|---|
| 4,523,100 A | * | 6/1985 | Payne | 250/559.33 |
| 4,766,775 A | * | 8/1988 | Hodge | 74/490.01 |
| 5,454,681 A | * | 10/1995 | Baur | 414/281 |
| 2010/0010505 A1 | * | 1/2010 | Herlihy et al. | 606/130 |

* cited by examiner

*Primary Examiner* — Saul Rodriguez
*Assistant Examiner* — Ronald Jarrett
(74) *Attorney, Agent, or Firm* — Marsh Fischmann & Breyfogle LLP; Daniel J. Sherwinter; Kent A. Lembke

(57) ABSTRACT

Systems and methods are described for fixed rotational positioning of a robotic hand assembly using mechanical wrist locking techniques. A wrist is configured to rotate the hand assembly and point grip components in a desired direction (e.g., for pick and place operations). Tolerances of components of the wrist can accumulate to manifest rotational positioning error. Embodiments include wrist locking techniques for locking the wrist in a desired rotational position. Some implementations couple grip components with wrist lock components in such a way that movement of the grip components causes the wrist lock assembly automatically to move between locked and unlocked states. For example, retracting the grip components pushes a wrist lock latch into an unlocked position (allowing the wrist to rotate). Extending the grip components allows the latch to move to a locked position where it interlocks with an alignment feature to lock the wrist into an accurate, predetermined angle.

9 Claims, 11 Drawing Sheets

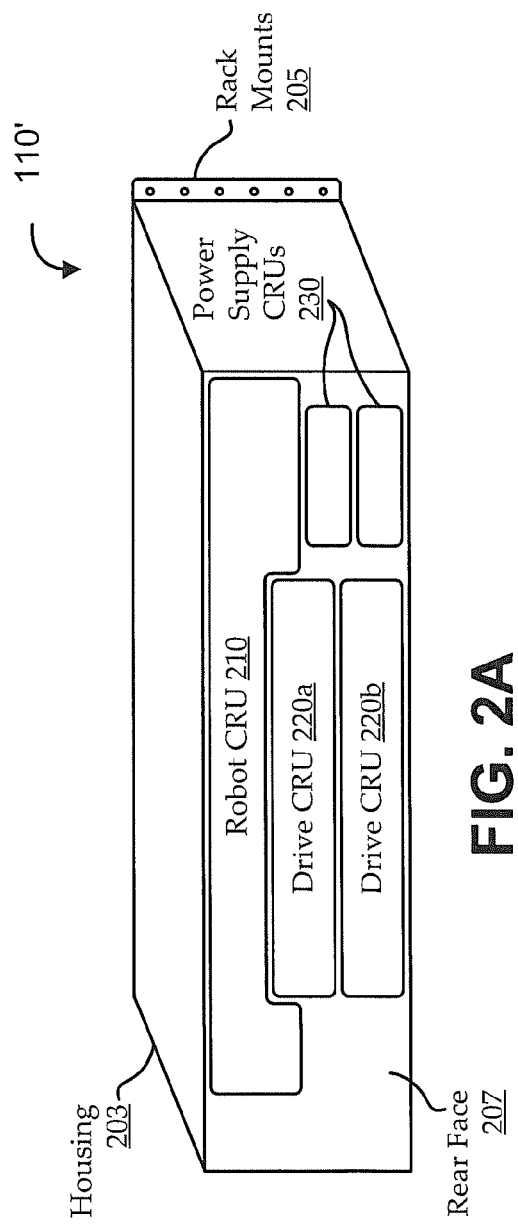
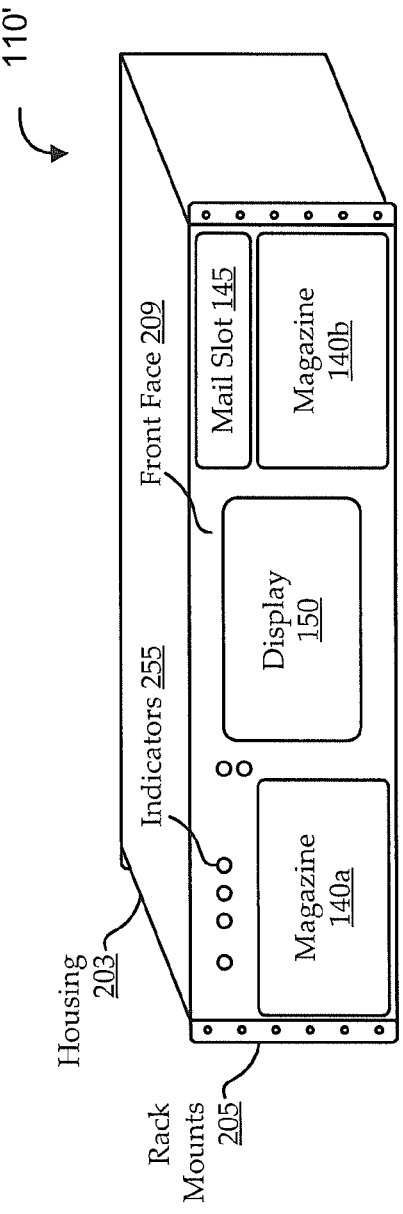

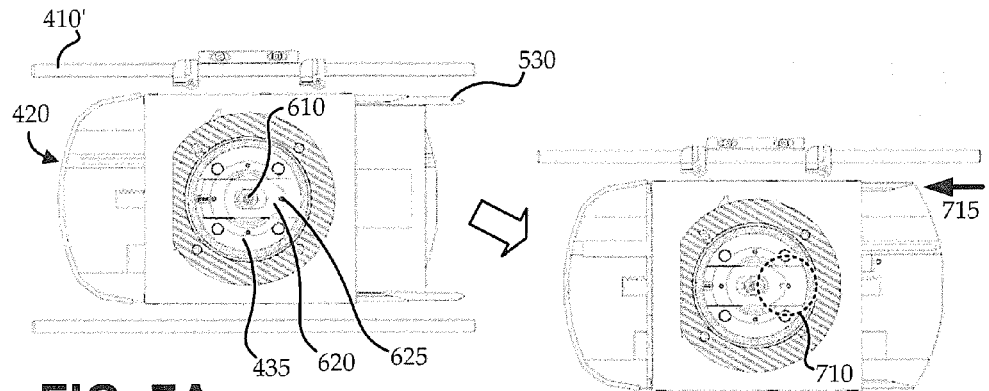
FIG. 7A
FIG. 7B
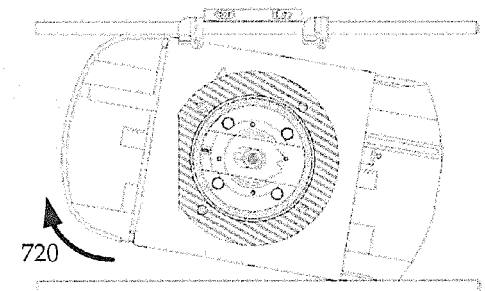
FIG. 7C
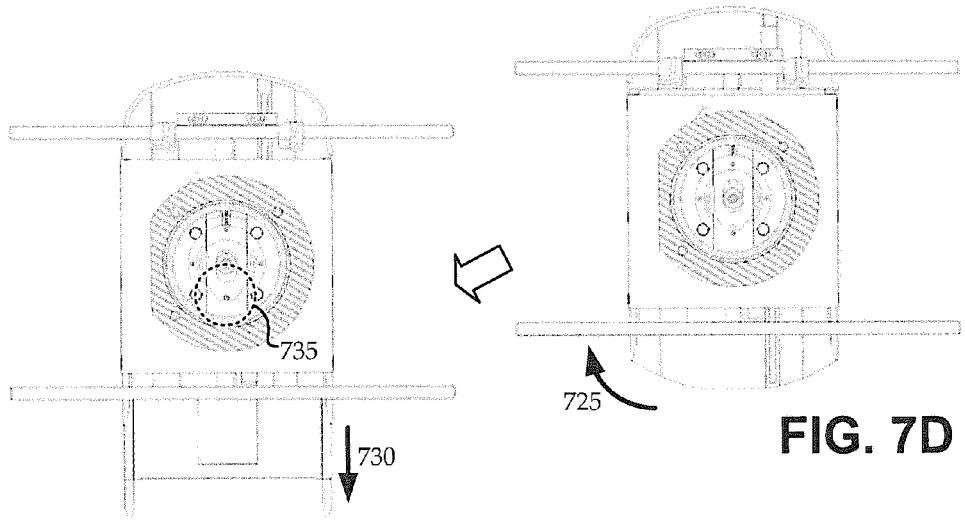
FIG. 7D
FIG. 7E

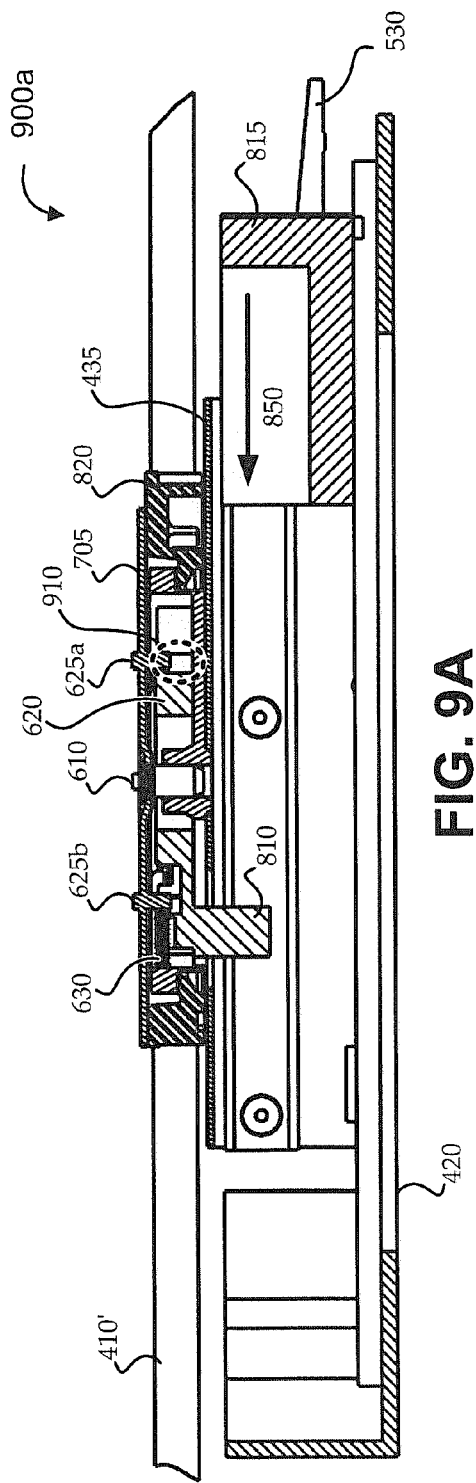
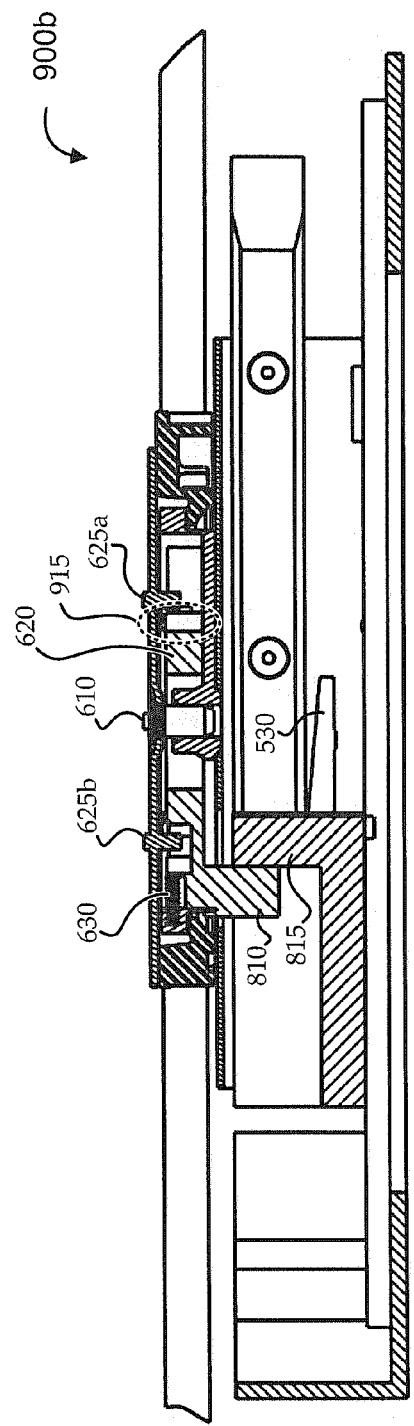

WRIST LOCK FOR A STORAGE LIBRARY

FIELD

Embodiments relate generally to data storage systems, and, more particularly, to robotic wrist mechanism locking in storage libraries.

BACKGROUND

Storage library systems are often used by enterprises and the like to efficiently store and retrieve data from storage media. In the case of some storage libraries, the media are data cartridges (e.g., tape cartridges) that are typically stored and indexed within a set of magazines. When particular data is requested, a specialized robotic mechanism finds the appropriate cartridge, removes the cartridge from its magazine, and carries the cartridge to a drive that is designed to receive the cartridge and read its contents. Some storage libraries have multiple drives that can operate concurrently to perform input/output (IO) operations on multiple cartridges.

To operate properly, the robotic mechanisms are expected to reliably (e.g., repeatably and accurately) and rapidly find, retrieve, and deliver desired cartridges throughout the storage library cartridge inventory. This functionality can be facilitated by configuring the robotic mechanism to move a hand assembly in at least three axes (e.g., x, y, and z directions, and sometimes one or more of pitch, roll, or yaw), and to include one or more sensors to reliably detect the position and/or orientation of the hand assembly. When in its desired location, the hand assembly is activated to reliably grip the desired cartridge and remove it from a magazine or drive, or to reliably release the cartridge into a desired magazine slot or drive.

Each degree of freedom provided to the robotic mechanism becomes a potential source of accumulated error when positioning grip components of the hand assembly. For example, even if the hand assembly is parked in such a way that it can only move rotationally using its "wrist" mechanism (e.g., in a yaw direction), errors accumulated from one or more components can adversely impact wrist positioning precision, thereby affecting reliable location and/or pointing of the grip components. Some traditional implementations attempt to address these accumulated tolerances through one or more feedback mechanisms, including sensors, stepper motors, alignment features, or the like. However, these traditional types of techniques can add cost and/or complexity to the implementation and, in some cases, additional sources of potential error.

Accordingly, it may be desirable to provide a reliable mechanism for accurate positioning of the wrist mechanism at a desired wrist angle without complex and/or costly feedback techniques.

BRIEF SUMMARY

Among other things, systems and methods are described for fixed rotational positioning of a hand assembly using mechanical wrist locking techniques. Some embodiments operate in the context of the data storage environment having a robotic mechanism configured to pick, place, and transport media cartridges throughout the environment. Various components and techniques are used to position (e.g., and park) the hand assembly in a desired X-Z location. The hand assembly includes a wrist mechanism configured to rotate the hand assembly thereby pointing grip components of the hand assembly in a desired direction. The wrist mechanism includes a novel wrist lock assembly configured to lock the wrist mechanism in the desired direction (e.g., at a particular rotational position, wrist angle, etc.). Embodiments of the wrist lock assembly are in mechanical communication with the grip components in such a way that movement of the grip components causes the wrist lock assembly to move between locked and unlocked states. In one embodiment, when the grip components are retracted into the hand assembly, they push a latch of the wrist lock assembly into an unlocked position out of contact with one or more alignment pins. When the grip components are extended from the hand assembly they allow the latch to be pushed into a locked position (e.g., under force applied by a spring), causing the latch to interface with the alignment pin(s) thereby locking the wrist mechanism into an accurate, predetermined wrist angle.

According to one set of embodiments, a wrist locking system is provided for a robotic hand assembly grip mechanism. The system includes: a grip mechanism configured to be moved between a first state and a second state; a wrist mechanism configured to rotate the grip mechanism to point substantially in a desired direction; an alignment feature; and a latch configured to be selectively interlocked with the alignment feature and in mechanical communication with the grip mechanism and the wrist mechanism in such a way that moving the grip mechanism to the first state mechanically causes the latch to transition to a locked state thereby interlocking the latch with the alignment feature so as to substantially prevent the wrist mechanism from rotating and so as to lock the grip mechanism in the desired direction, and moving the grip mechanism to the second state mechanically causes the latch to transition to an unlocked state thereby releasing the latch from the alignment feature so as to free the wrist mechanism to rotate the grip mechanism away from the desired location.

According to another set of embodiments, a method is provided for secured rotational positioning of a robotic hand assembly. The method includes: moving a grip mechanism from a first position to a second position causing the grip mechanism to interface with a latch in such a way as to transition the latch from a locked state to an unlocked state, the latch being part of a wrist mechanism configured to rotate an orientation of the grip mechanism when the latch is in the unlocked state; rotating the orientation of the grip mechanism using the wrist mechanism substantially to a desired wrist position; and moving the grip mechanism from the second position to the first position causing the grip mechanism to interface with the latch in such a way as to transition the latch from the unlocked state to the locked state, thereby locking the wrist mechanism into the desired wrist position.

According to yet another set of embodiments, a system is provided. The system includes: a structural framework; a transport assembly coupled with the structural framework and configured to transport a mounting to a desired X-Z position with reference to the structural framework; and a hand assembly having a wrist mechanism configured to rotatably couple the hand assembly to the mounting and having a grip mechanism configured to transition between a first state and a second state. The wrist mechanism includes: a wrist driver configured to rotate the grip mechanism to point substantially in a desired direction; a first locking feature configured to remain in a substantially fixed orientation with reference to the structural framework regardless of the orientation of the grip mechanism; and a second locking feature configured to rotate in accordance with rotating the grip mechanism, to selectively interlock with the first locking feature, and to interface with the grip mechanism in such a way that transitioning the grip mechanism to the first state mechanically causes the second locking feature to interlock with the first locking feature so as to lock the grip mechanism in the desired direction, and in such a way that moving the grip mechanism to the second state mechanically causes the latch to transition to an unlocked state thereby releasing the second locking feature from the first locking feature thereby freeing the wrist driver to rotate the grip mechanism.

BRIEF DESCRIPTION OF THE DRAWINGS

The present disclosure is described in conjunction with the appended figures:

FIGS. 2A and 2B show rear and front views, respectively, of an illustrative base module, according to various embodiments;

FIGS. 7A-7E show a sequence in which an illustrative hand assembly is moved from one secured position to another secured position using wrist locking functionality, according to various embodiments;

FIGS. 9A and 9B show to side views of the wrist lock assembly described above with reference to FIGS. 6A-8, according to various embodiments.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
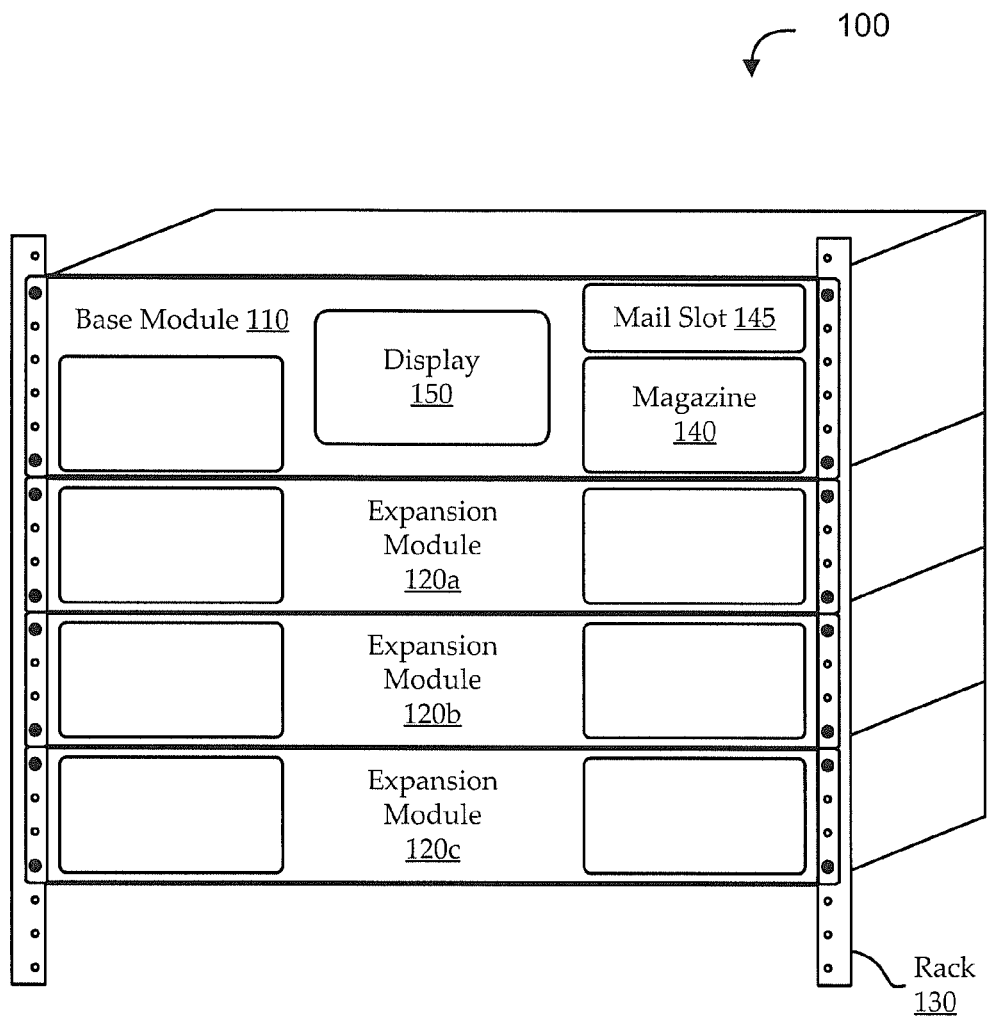
FIG. 1 shows a block diagram of an illustrative rack-mounted storage library, to provide a context for various embodiments.

For the sake of context, FIG. 1 shows a rack-mounted storage library 100 for use with various embodiments. The storage library 100 includes a base module 110 and one or more expansion modules 120, configured to be mounted in an equipment rack 130 (only the mounting rails of the equipment rack 130 are shown for simplicity). The base module 110 and expansion modules 120 provide physical storage for multiple storage media cartridges (e.g., tape cartridges) in magazines 140. Embodiments also include one or more media drives (e.g., tape drives), controllers, power supplies, indicators, communications subsystems, and/or other functions. As will be discussed more fully below, the storage library 100 also includes a robotic mechanism for finding and ferrying storage media cartridges between locations within the storage library 100 (e.g., magazines 140 and drives).

According to an illustrative embodiment, the storage library 100 is a small, rack-mounted, automated tape library. The base module 110 is "3 RU" high (three standard rack units, or approximately 5.25-inch high) and includes one robotic mechanism. Up to nine additional, "2 RU" high (approximately 3.5-inch high) expansion modules 120 can be added to provide additional drive and/or magazine 140 slot capacity, so that a maximum configuration of one base module 110 and nine expansion modules 120 has a total height of "21 RU," or half of a standard equipment rack 130. The single robot mechanism is configured to access all magazine 140 slots and drives in the base module 110 and all expansion modules 120.

In the illustrative embodiment, each of the base module 110 and the expansion modules 120 can house up to two half-height or one full-height LTO5 tape drives. Each of the base module 110 and the expansion modules 120 can also house two removable magazines 140, each having fifteen cartridge slots. In some implementations, the storage library 100 can be divided into partitions each associated with, for example, at least one drive and at least one magazine 140. Each partition can be configured to behave as an independent library, notwithstanding that all partitions share the single robotic mechanism (e.g., partitions can be commanded as independent libraries for tape operations, while sharing many resources for service and administration). Some implementations also include a "mailslot" 145 in the base module 110, as discussed below.

Some embodiments provide local and remote management of various functions through graphical user interfaces (GUI). In one implementation, the local interface GUI is displayed on a seven-inch, front-mounted, touch-screen panel display 150. The remote interface may be implemented as a browser-based interface (BUI), accessible by connecting a web browser to the library's Internet protocol (IP) address.

Some embodiments are configured to be installable and serviceable by end customers to the greatest extent practical. For example, an installation wizard may be provided to simplify initial installation, a simple rack rail system for base modules 110 and expansion modules 120 will allow two people without any mechanical assistance (e.g. lift) to easily install the modules on an equipment rack 130. In some such embodiments, most replaceable library components will be Customer Replaceable Units (CRUs) (i.e., as opposed to field replaceable units (FRUs), which are serviceable and/or replaceable only by trained technicians). For example, certain implementations allow almost all installation, maintenance, upgrades, and/or normal use of the storage library 100 to be performed with only front and rear access to the equipment rack 130 and few or no tools.

FIGS. 2A and 2B show rear and front views, respectively, of an illustrative base module 110', according to various embodiments. The illustrative base module 110' may be an implementation of base module 110 of FIG. 1. As shown, the base module 110' includes a housing 203 (e.g., a chassis) configured with rack mounts 205 for mounting to an equipment rack (e.g., as shown in FIG. 1). A rear face 207 and a front face 209 are also shown as part of the housing 203. As discussed above, embodiments such as the one illustrated as base module 110', are designed to facilitate customer serviceability. Accordingly, most of the replaceable components are shown as accessible from the front and rear exterior of the base module 110', which would be substantially exposed when mounted in a standard equipment rack.

Looking at the rear view of the base module 110' in FIG. 2A, access is provided to a robot CRU 210, one or more drive CRUs 220, and one or more power supply CRUs 230. As will be described more fully below, the robot CRU 210 is configured to house the robotic mechanism and supporting components (e.g., mechanical drive modules, control hardware and software modules, configuration memory, etc.). Traditional storage library systems typically are configured so that the robotic mechanisms are only serviceable by highly trained personnel, and even removing the mechanism to send out for off-site servicing requires training, specialized tools, or the like. The ability to replace the entire robotic mechanism and all its supporting components in a single CRU is a novel improvement over traditional implementations. For example, implementations allow a customer to simply pop out a broken robot CRU 210 using a couple of thumb screws, slide in a replacement CRU, and reinitialize the system, without waiting for a technician to troubleshoot and fix any issues.

Embodiments of the drive CRUs 220 are media drive modules that can be removed by an end consumer. Various implementations support standard, half-height or full-height tape drives. As described more fully below, the port in the drive for receiving a media cartridge faces into the base module 110', so that media cartridges can only be inserted and/or removed by the robotic mechanism within the confines of the housing 203. In some implementations, one or more "external" media drives may be provided to facilitate troubleshooting and the like.

Embodiments of the power supply CRUs 230 include any useful type of power supply components for supplying power to the base module 110' and or to any other components (e.g., to one or more expansion modules 120 (not shown)). For example, the power supply CRUs 230 can include power generators, power converters, power conditioners, back-up batteries and/or other power duplication, switches, input and/or output ports, indicators, and the like. In some implementations, each power supply CRU 230 includes a male, three-prong connector for interfacing with line power and a main power switch. Some embodiments include a power supply CRU 230 for each drive CRU 220 (i.e., if the base module 110' has only a single drive CRU 220, it may also only have a single power supply CRU 230 to support the drive). In other embodiments, a second power supply CRU 230 is used as a backup supply to the first power supply CRU 230, and may be coupled with a different power source.

In one implementation, the base module 110' has slots for two power supplies (e.g., two power supply CRUs 230). These can be implemented as custom power supplies, for example, having an input voltage of 100-250 volts AC at 50-60 Hertz, and an output voltage of twelve volts DC switched plus five volts DC standby power. For example, the power supplies may be sized to run two tape drives plus robotics and any other sensors, etc. (e.g., with or without redundancy). Typically, the base module 110' has at least one power supply, even if no drives are included, to support the main processor, interface functionality (e.g., the display 150), etc.

Looking at the front view of the base module 110' in FIG. 2B, access is provided to a display 150, one or more magazines 140, and a mailslot 145. One or more indicators 255 may also be provided to show certain operational states, and the like (note that the sizes, numbers, positions, etc. of the indicators shown are intended only to be illustrative). In various implementations, base module 110 has overall library status indicators on the front and back of the module, along with a locate switch which activates the front and back locate LEDs; powered CRUs may have their own status indicators; hot-swappable CRUs can have indicators that show when the CRUs can be safely removed; power supplies and tape drives can have additional indicators; an "AC present" indicator can be provided to stay on even when the storage library is off (as long as AC power is connected). In one embodiment, a set of primary indicators include "locate," "fault," and "OK" indications. Next to the primary indicators are secondary indicators specific for the operator panel that indicate the status of the operator panel (e.g., an operator panel CRU, if implemented as such).

Other types of indications and status can also be provided using the display 150. Embodiments of the display 150 are used to facilitate various functionality through a local graphical user interface (GUI), including, for example, 10 functions, service and diagnostic functions, etc. In one implementation, the display 150 is a seven-inch, front-mounted, touch-screen panel (e.g., an LCD touch panel display with a WVGA (wide VGA) 800×480 pixel screen equipped with a resistive or capacitive touch-sensitive overlay).

Each magazine 140 can be configured to hold multiple (e.g., up to fifteen) cartridges in such a way as to be reliably accessed by the robotic mechanism. For example, the magazines 140 can be designed to have features to aid in targeting, location, and or other functions of the robotic mechanism; features that securely hold the cartridges in place, while allowing for easy release of the cartridges to a robotic gripper when desired; features to add strength to the magazines 140 (e.g., to reduce sag, increase usable life, etc.) and/or to reduce weight; etc.

Embodiments of the mailslot 145 (or "Cartridge Access Port" (CAP)) include a special type of magazine designed to act as a controlled interface between the human user and the robotic mechanism. To add or remove cartridges from the storage library, a user ejects the mailslot 145 from the base module 110' and is presented with a number of cartridge slots (e.g., four "Import/Export cells" ("I/E cells")). The user can then insert cartridges into, or remove cartridges from, these slots without interfering with robotic mechanism's operations. In some implementations, the robotic mechanism is used to activate a latch internal to the base module 110, thereby allowing the user to remove the mailslot 145 only when the robotic mechanism is in an appropriate condition (e.g., parked in the robot CRU 210). Certain embodiments having data partitions (as discussed above) only allow one partition at a time to make use of the mailslot 145.

Figure 3A:
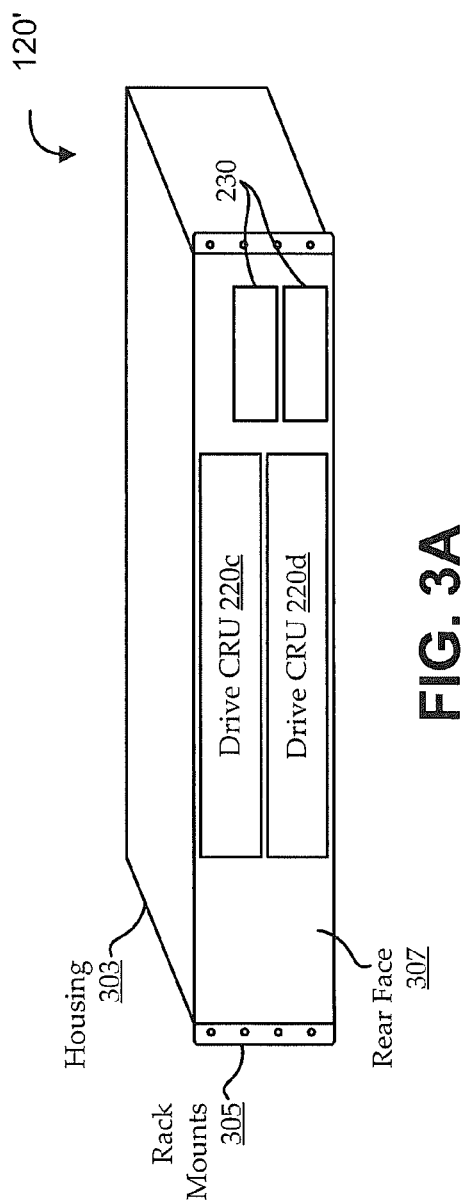
FIGS. 3A and 3B show rear and front views, respectively, of an illustrative expansion module, according to various embodiments.
Figure 3B:
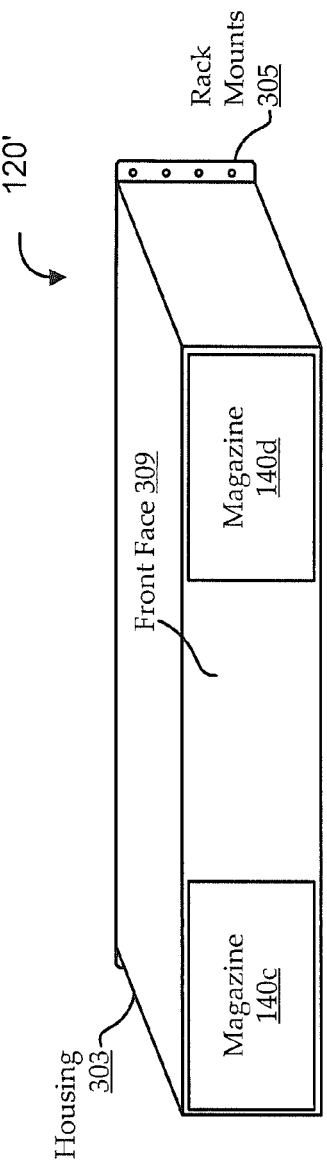

FIGS. 3A and 3B show rear and front views, respectively, of an illustrative expansion module 120', according to various embodiments. The illustrative expansion module 120' may be an implementation of expansion module 120 of FIG. 1. As shown, the expansion module 120' includes a housing 303

(e.g., a chassis) configured with rack mounts 305 for mounting to an equipment rack (e.g., as shown in FIG. 1). A rear face 307 and a front face 309 are also shown as part of the housing 303. As with the base module 110' of FIGS. 2A and 2B, the expansion module 120' is designed to facilitate customer serviceability. Most of the replaceable components are shown as accessible from the front and rear exterior of the expansion module 120', which would be substantially exposed when mounted in a standard equipment rack.

In the embodiment shown, various aspects of the expansion module 120' are similar or identical to the base module 110'. For example, embodiments of the expansion module 120' do not typically have a robot CRU 210, display 150, or mailslot 145, as they are configured to exploit that functionality from the base module 110' components. However, like the base module 110', the expansion module 120' includes one or more drive CRUs 220 and one or more power supply CRUs 230 configured to be accessed from the rear side of the expansion module 120', and one or more magazines 140 configured to be accessed from the front side of the expansion module 120'. In some embodiments, the drive CRUs 220, power supply CRUs 230, and/or magazines 140 of the expansion module 120' are the same as those implemented in the base module 110'.

Because of the lack of certain features in embodiments of the expansion module 120' (e.g., there may be no robot CRU 210, no main processor, etc.), expansion module 120' power requirements may be different from those of the base module 110. In certain implementations, the expansion modules 120' still have slots for two power supplies (e.g., two power supply CRUs 230), which can be implemented as the same power supplies used in the base module 110 (e.g., to avoid having to support or source multiple types of power supplies). However, the power supplies of the base module 110 may provide more power than is needed to run configurations of the expansion modules 120'. For example, a single power supply may be able to support an expansion module 120' even with two drives, and it is possible to implement an expansion module 120' with no drives and no power supplies. Alternatively, two power supplies may still be used, for example, to provide redundancy.

As discussed above, the base module 110' and expansion modules 120' include a number of components that can be designed for customer replaceability, including the robot CRU 210, drive CRUs 220, power supply CRUs 230, and magazines 140. It is worth noting that, even though these components may be accessible and replaceable by customers, embodiments may still be configured to prevent (or mitigate) undesirable interference with those components. As one example, those replaceable components typically are installed in a physically secure manner (e.g., using latches, thumbscrews, removable faceplates, and/or other techniques) to provide relatively easy access when needed, while mitigating inadvertent access (e.g., accidental removal of a magazine 140 during operation). As another example, certain embodiments may allow a drive CRU 220 to be removed during operation of the storage system, so long as the drive is not actively in use (e.g., by using a drive eject or park command, or other technique). As still another example, removal of the robot CRU 210 or magazines 145 may be prevented until certain operations have been completed (e.g., the robotic mechanism is parked within the base module 110', etc.).

Figure 4A:
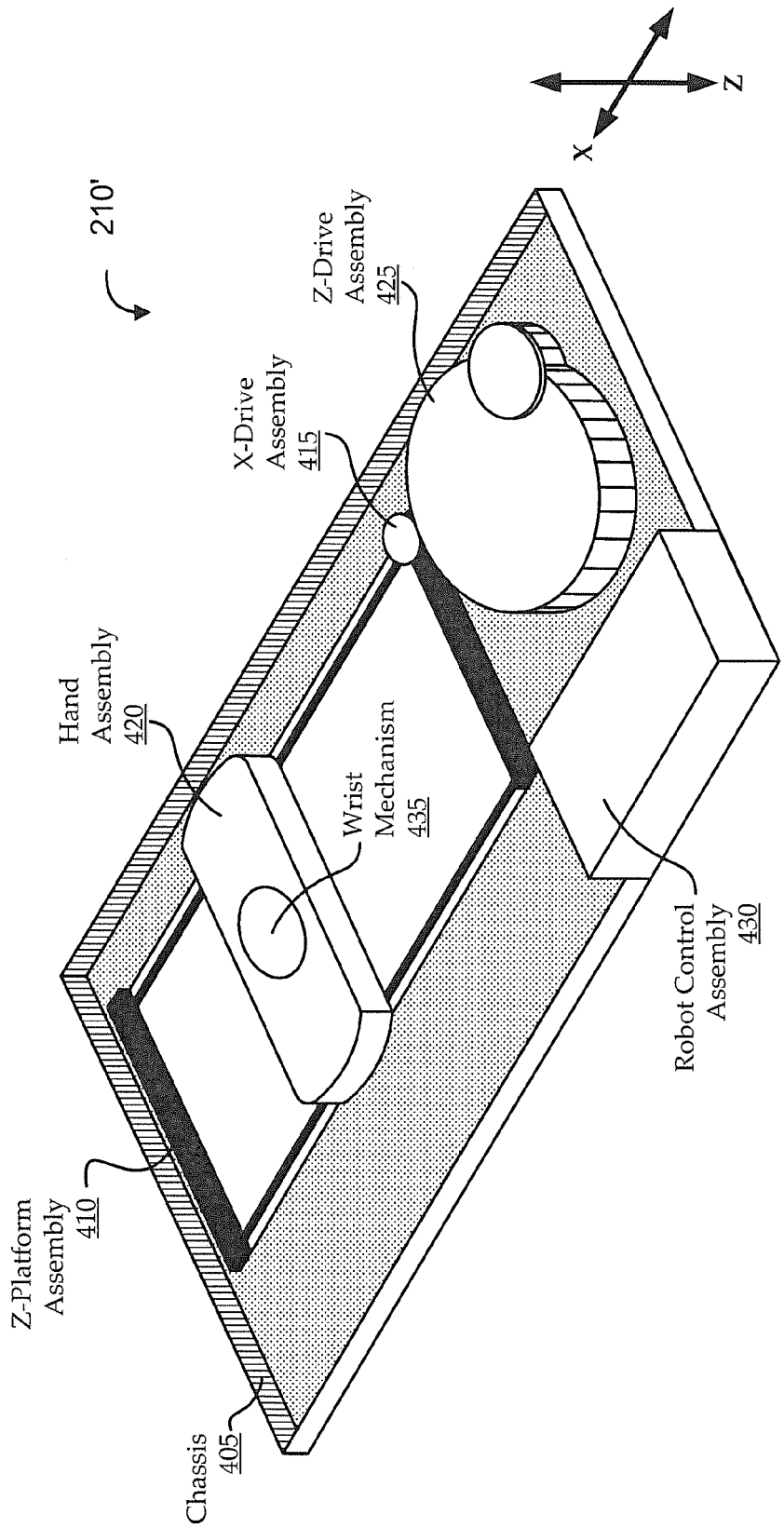
FIG. 4A shows a view looking down on the underside of an illustrative robot CRU (customer replaceable unit), according to various embodiments.
Figure 4B:
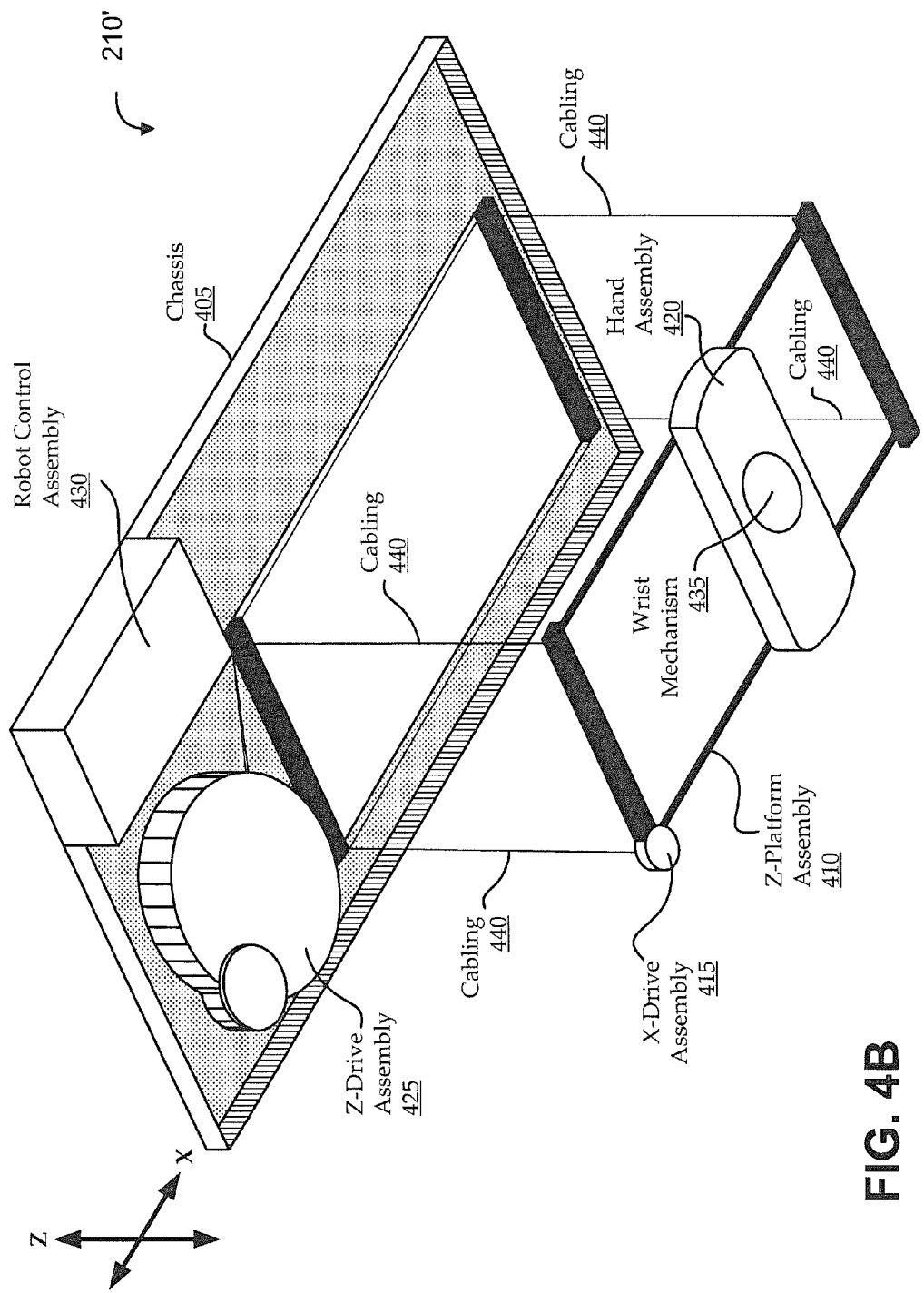
FIG. 4B shows another view looking up at the underside of an illustrative robot CRU with the Z-platform assembly partially lowered, according to various embodiments.

Much of the functionality of storage systems, like those discussed above with reference to FIGS. 1-3B, is facilitated by the robotic mechanism. As discussed above, the robotic mechanism is used to locate cartridges and ferry them between magazine slot locations and media drives. FIGS. 4A and 4B illustrate two views of an illustrative robot mechanism implemented as part of a robot CRU 210. The illustrations and descriptions of the robotic mechanism are highly simplified and represent only one possible type of implementation. Accordingly, they are intended only to add clarity and context and should not be construed as limiting the scope of the invention.

Turning to FIG. 4A, a view is shown looking down on the underside of an illustrative robot CRU 210', according to various embodiments. The robot CRU 210' may be an implementation of the robot CRU 210 of a base module 110, as discussed with reference to FIG. 2A. The robot CRU 210' includes a chassis 405 that houses a Z-platform assembly 410, an X-drive assembly 415, a hand assembly 420, a Z-drive assembly 425, and a robot control assembly 430.

In the implementation shown, the robotic mechanism is configured to move from its "home" position in the robot CRU 210' of the base module 110' down and/or over to any magazine 145 slot or drive in the base module 110' or an expansion module 120'. To accomplish this type of motion, the hand assembly 420 of the robotic mechanism moves in at least a "Z" direction (for the sake of FIGS. 4A and 4B, the +Z-direction is up towards the home position in the robot CRU 210, and the −Z-direction is down towards the bottom-most magazine slots of the bottom-most expansion module 120') and an "X" direction (for the sake of FIGS. 4A and 4B, the +X direction is towards the front side of the base module 110' or expansion modules 120', and the −X direction is towards the rear side of the base module 110' or expansion modules 120').

The hand assembly 420 is coupled with the Z-platform assembly 410, which can be moved in the Z-direction (i.e., raised and lowered) by the Z-drive assembly 425. The hand assembly 420 is also movable along the Z-drive assembly 425 in the X-direction by the X-drive assembly 415 (e.g., along rails that are substantially perpendicular to the Z-directional axis). The Z-drive assembly 425 and X-drive assembly 415 may include any hardware for providing the desired movements, such as cables, gears, belts, rails, wheels, bearings, etc. Embodiments provide other types of motion in other ways. Some embodiments of the hand assembly 420 are coupled to the Z-platform assembly 410 via a "wrist" mechanism 435 that provides motion in a yaw direction (i.e., around the Z-directional axis). Some embodiments of the hand assembly 420 further provide radial movement from the Z-directional axis. For example, a grip mechanism can "reach out" in a radial direction that is determined by the yaw (rotational) orientation provided by the wrist mechanism 435.

These various types of motion of the robotic mechanism, as well as other functionality of the robotic mechanism, are handled at least in part by the robot control assembly 430. Embodiments of the robot control assembly 430 are effectively the "brains" of the robotic mechanism, including electronic components used to store calibration information for the robotic mechanism, control movements of the robotic mechanism, read and/or decipher sensor information retrieved from the robotic mechanism, etc. For example, if data from a particular cartridge is desired, the robot control assembly 430 may direct the robotic mechanism to move to the magazine slot associated with that cartridge, verify presence of the cartridge, retrieve the cartridge from the magazine, ferry the cartridge to a drive, and release the cartridge into the drive.

For added clarity, FIG. 4B shows another view looking up at the underside of an illustrative robot CRU 210' with the Z-platform assembly 410 partially lowered, according to various embodiments. As illustrated, the Z-platform assembly 410 may not have a solid platform, and may instead be implemented as a carriage having a number of structural members (e.g., rails, supports, etc.). In the particular embodiment shown, the Z-drive assembly 425 includes motors and gearing that drive a bullwheel. The Z-platform assembly 410 is coupled with the bullwheel using a cable and pulley system. For example, cabling 440 is attached at each corner of the Z-platform assembly 410. The four cables 440 pass through pulleys and wrap around the bullwheel. Turning the bullwheel in one direction or the other adds slack to, or removes slack from, the cables 440, causing the Z-platform assembly 410 to be raised or lowered. Once in its desired Z-position (or while moving to that position), the X-drive assembly 415 can be used to move the hand assembly 420 (e.g., along rails of the Z-platform assembly 410) to a desired X-location. Once in its desired X-Z-position (or while moving to that position), the hand assembly 420 can be turned using a wrist mechanism 435 to a desired rotational orientation (e.g., to face a cartridge slot or a media drive, to provide a desired angle for use of a sensor, etc.). If desired, a grip mechanism may then be used to reach out (i.e., radially) from that X-Z-position and rotational orientation (e.g., to grab or release a cartridge).

It will be appreciated that many functions of the robotic mechanism (e.g., pick and place functionality) may rely on accurate and repeatable positioning of components of the robotic mechanism. Various techniques can be used to effectively secure the Z-platform assembly 410 in a desired Z-location and/or to effectively secure the hand assembly 420 in a desired X-location on the Z-platform assembly 410. Still, components of the hand assembly 420, including components of the wrist mechanism 435, can manifest accumulated tolerances. For example, gear backlash, axle clearance, stepper motor error (e.g., due to skipped motor steps), etc. can manifest in such a way that the hand assembly 420 is pointing in a direction other than the one expected. Traditional implementations use high tolerance components, additional sensors, and other techniques to address these accumulated tolerances. However, these traditional techniques tend to add cost and complexity to the design.

Embodiments provide novel techniques for mechanically locking the wrist angle for reliable (e.g., accurate and repeatable) wrist positioning. According to some embodiments, wrist locking functionality is coupled with operation of the grip mechanism, so that the wrist position is reliably maintained during pick and place operations. As described below, implementations force a latch (e.g., by preloading the latch using spring tension) against one or more alignment pins so as to lock the wrist mechanism 435 into a desired wrist angle. For example, various components, including the Z-drive assembly 425 and the X-drive assembly 415, are used to park the hand assembly 420 in a desired X-Z-position; the hand assembly 420 is mechanically secured to the Z-platform assembly 410 in such a way as to effectively maintain the hand assembly 420 at a fixed pitch and roll with respect to the Z-platform assembly 410; and the wrist lock functionality is used to park the hand assembly 420 in a desired yaw position (i.e., wrist angle). In this configuration, the only remaining degree of freedom is that of the grip mechanism which is allowed to reach out (i.e., radially) from the hand assembly 420.

Figure 5:
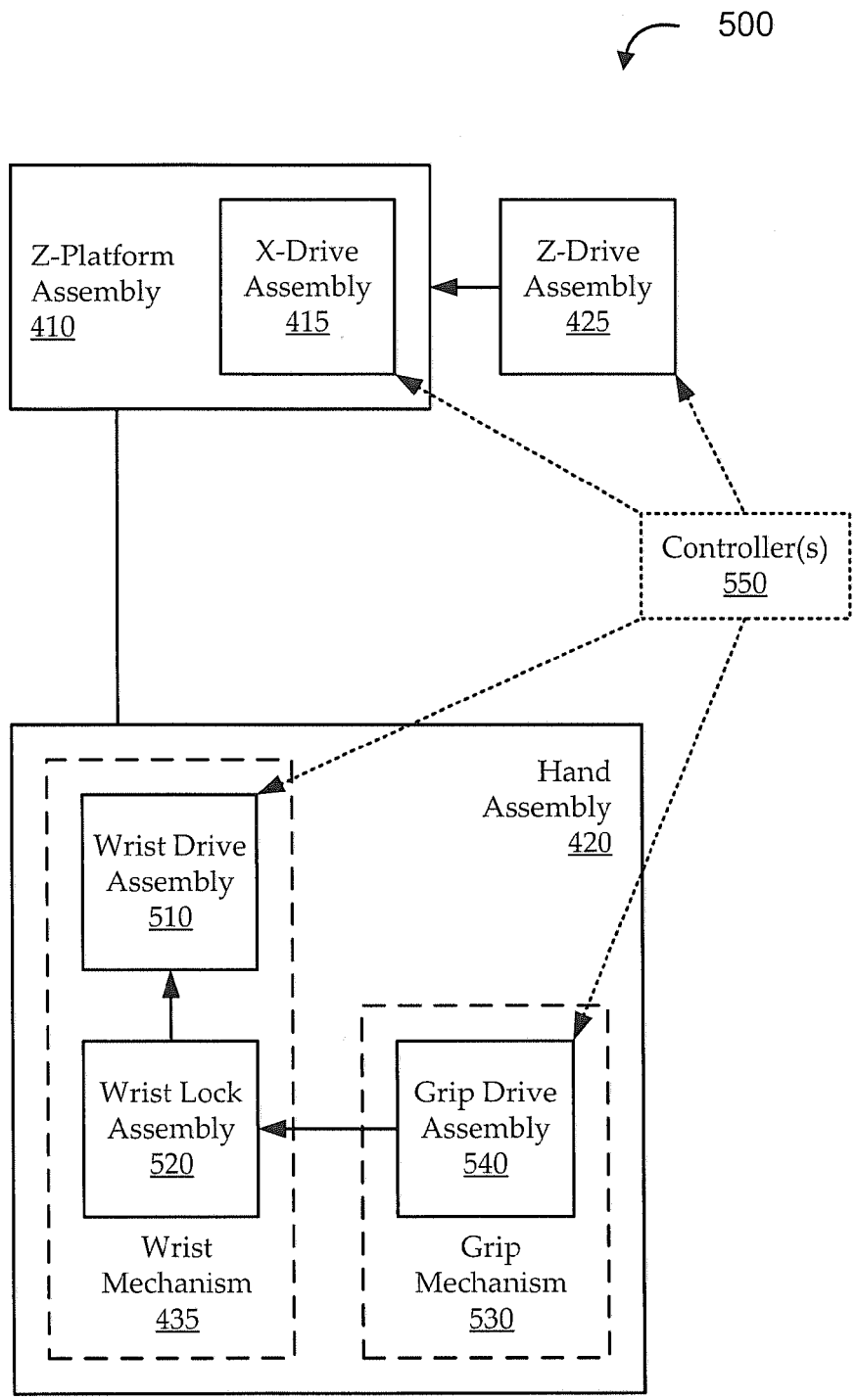
FIG. 5 shows a block diagram of an illustrative robotic assembly environment having wrist locking functionality, according to various embodiments.

FIG. 5 shows a block diagram of an illustrative robotic assembly environment 500 having wrist locking functionality, according to various embodiments. The illustrative environment 500 includes simplified functional block diagrams of the hand assembly 420 coupled with the Z-platform assembly 410. It is worth noting that the various functional blocks are shown to add clarity to the description, but are not intended to represent the full functionality of their respective assemblies were the only arrangement or implementation of those functions within the context of the various assemblies. Rather, modifications can be made without departing from the scope of embodiments, as will be appreciated from the description herein.

As described above, it is assumed that the hand assembly 420 is coupled with the Z-platform assembly 410 (e.g., any type of carriage or other structure configured to transport the hand assembly 420 as desired) in such a way as to move the hand assembly 420 to a desired X-Z-location. In particular, a Z-drive assembly 425 can be used to move the Z-platform assembly 410 to a desired Z-location; and in X-drive assembly 415 (e.g. integrated with the Z-platform assembly 410) can be used to move the hand assembly 422 a desired X-location in context of the Z-location provided by the Z-platform assembly 410. Once in the desired X-Z-location a wrist mechanism 435 is used to rotate the hand assembly 420 to a desired wrist angle, which may effectively point a grip mechanism 530 in a desired direction.

One or more techniques can be used to secure (e.g., lock, parks, etc.) the hand assembly 420 in the Z-location, the X-location, a pitch orientation, a roll orientation, and/or in other ways. Embodiments of the wrist mechanism 435 include a wrist drive assembly 510 and a wrist lock assembly 520. The wrist drive assembly 510 is configured to drive the rotation of the hand assembly 420 until a desired wrist angle is substantially reached, and the wrist lock assembly 520 is used to lock the wrist mechanism 435 into that wrist angle. A grip drive assembly 540 of the grip mechanism 530 can then be used to drive one or more gripper components, for example to extend "fingers" of the hand assembly 420.

Positioning and/or other functionality of the hand assembly may be controlled by one or more controllers 550. According to some embodiments, one or more processors is configured to send instructions to and/or receive feedback from the Z-drive assembly 425, the X-drive assembly 415, the wrist drive assembly 510, the grip drive assembly 540, etc. The same and/or other functions of the hand assembly 420 can be controlled in other ways, for example, using mechanical interconnections. Embodiments of the wrist lock assembly 520 are mechanically coupled with the grip drive assembly 540 in such a way that operation of the grip drive assembly 540 can be used to automatically activate and/or deactivate the wrist lock assembly 520. For example, the mechanical interconnection can be configured so that extension of the grip mechanism 530 (e.g. for a pick or place operation) automatically causes the wrist lock assembly 522 to lock the wrist mechanism 435 into a desired wrist angle.

Figure 6A:
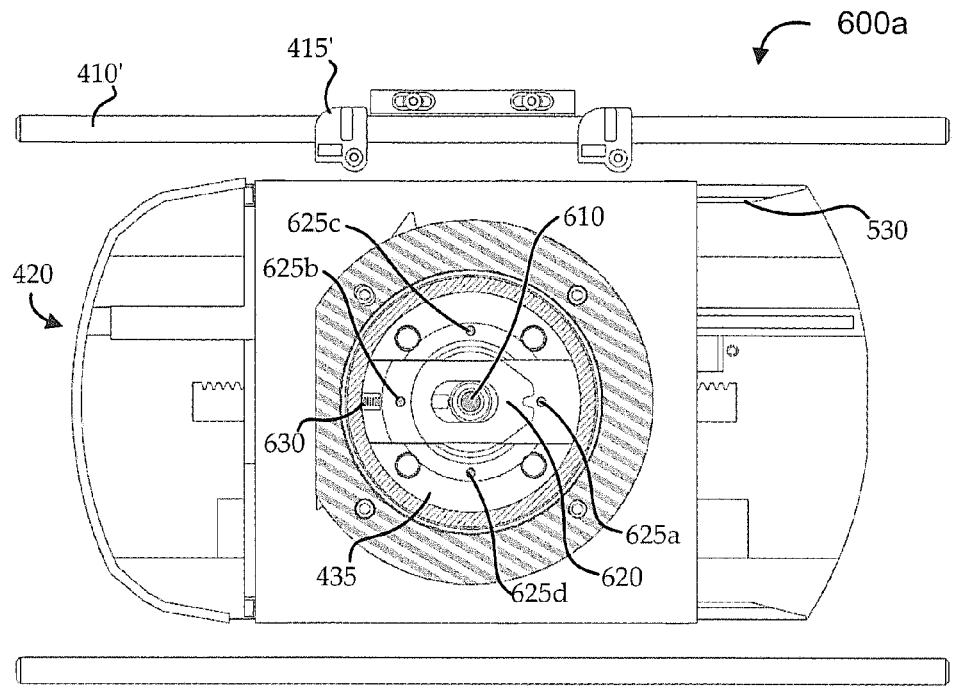
FIG. 6A shows a first top view of an illustrative hand assembly with its wrist mechanism in an unlocked state, according to various embodiments.

FIGS. 6A-9B show a number of different views of one illustrative implementation of a wrist lock assembly for performing the functionality described herein. Turning first to FIG. 6A, a first top view 600a is shown of an illustrative hand assembly 420 with its wrist mechanism 435 in an unlocked state, according to various embodiments. The illustrative hand assembly 420 is shown in the context of a partial Z-platform assembly 410' and partial X-drive assembly 415', and the hand assembly 420 is suspended from structure that includes components of the wrist mechanism 435. The wrist mechanism 435 is configured to rotate the hand assembly 420 around axis 610, thereby pointing grip mechanism 530 in a desired direction.

Various components of an illustrative wrist lock assembly are visible in FIG. 6A, including a latch 620, multiple alignment pins 625, and a tensioner 630. As illustrated, the tensioner 630 includes a spring configured to preload the latch 620. In the unlocked state, the grip mechanism 530 is configured to push the latch 620 into the preloaded position shown.

In the preloaded position, the latch 620 is not interfacing with any of the alignment pins 625. Accordingly, the hand assembly 420 is free to rotate about axis 610 without interference from the alignment pins 625.

Figure 6B:
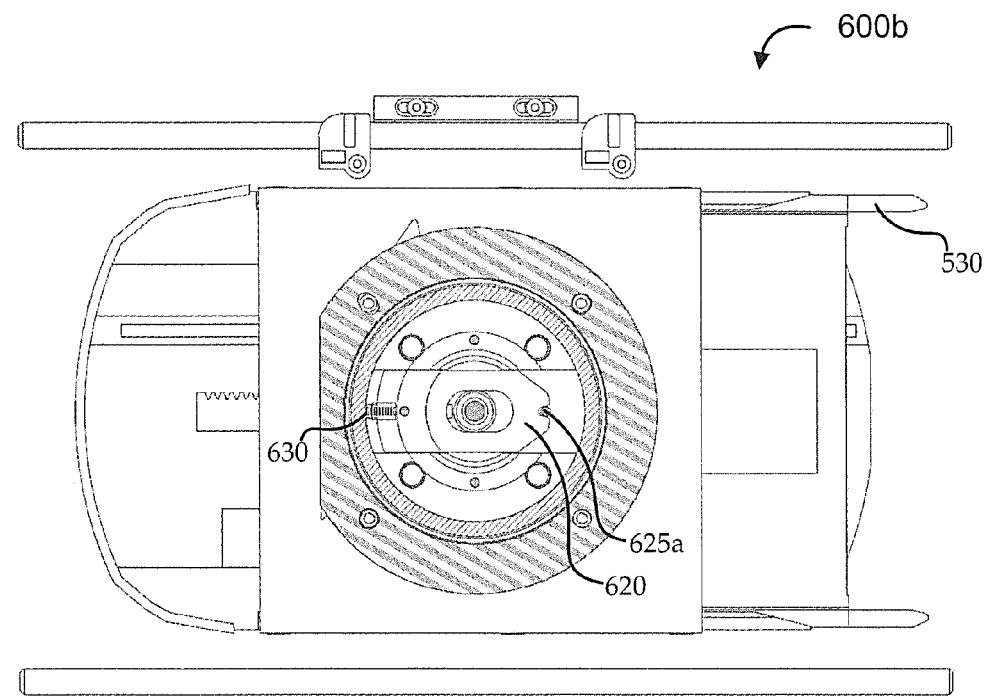
FIG. 6B shows a second top view of the same illustrative hand assembly with its wrist mechanism in a locked state, according to various embodiments.

Turning to FIG. 6B, a second top view 600b is shown of the same illustrative hand assembly 420 with its wrist mechanism 435 in a locked state, according to various embodiments. As illustrated, the grip mechanism 530 is extended. This releases the tension from the tensioner 630 into the latch 620, forcing the latch 622 interface with alignment pin 625a. The interface between the latch 620 and alignment pin 625a is configured to effectively lock the wrist mechanism 530 into a wrist angle set by the location of the alignment pin 625a. Four alignment pins 625 are shown, which may allow the hand assembly 420 to be locked in four distinct positions. Notably, any number of alignment pins 625 may be provided, which may allow the hand assembly 420 to be locked in any number of positions (i.e., wrist angles).

FIGS. 7A-7E show a sequence in which an illustrative hand assembly 420 is moved from one secured position to another secured position using wrist locking functionality, according to various embodiments. Beginning with FIG. 7A, the hand assembly 420 is shown in a substantially identical position, orientation, and state as that of FIG. 6B. In particular, the wrist mechanism 435 is in a locked state, with its latch 620 forced into a coupling with an alignment pin 625. As described above, the locked state prevents the wrist mechanism 435 from rotating the hand assembly 420 about axis 610.

Moving to FIG. 7B, components of the grip mechanism 530 are refracted in the direction of arrow 715. As highlighted by the region labeled 710, the latch is moved out of contact with the alignment pin 625 and into its preloaded position, substantially as illustrated above in FIG. 6A. In this unlocked state, the hand assembly 420 is free to rotate about axis 610 without interference from the alignment pin 625. FIGS. 7C and 7D show the hand assembly 420 being rotated by the wrist mechanism 435. As illustrated, the hand assembly 420 is being rotated approximately ninety degrees in a substantially clockwise direction, as shown by arrows 720 and 725.

In FIG. 7E, the hand assembly has completed a rotation of approximately ninety degrees in a substantially clockwise direction. Once again, components of the grip mechanism 530 are extended. As highlighted by region 735, extension of the grip mechanism 530 forces the latch 620 against a different alignment pin 625, thereby effectively locking the wrist mechanism 435 into the new wrist angle. Notably, rotation of the hand assembly 420 caused the grip mechanism 530 to be in a different direction, though the wrist angle could be locked in either or both (or other) positions using multiple alignment pins 625.

Figure 8:
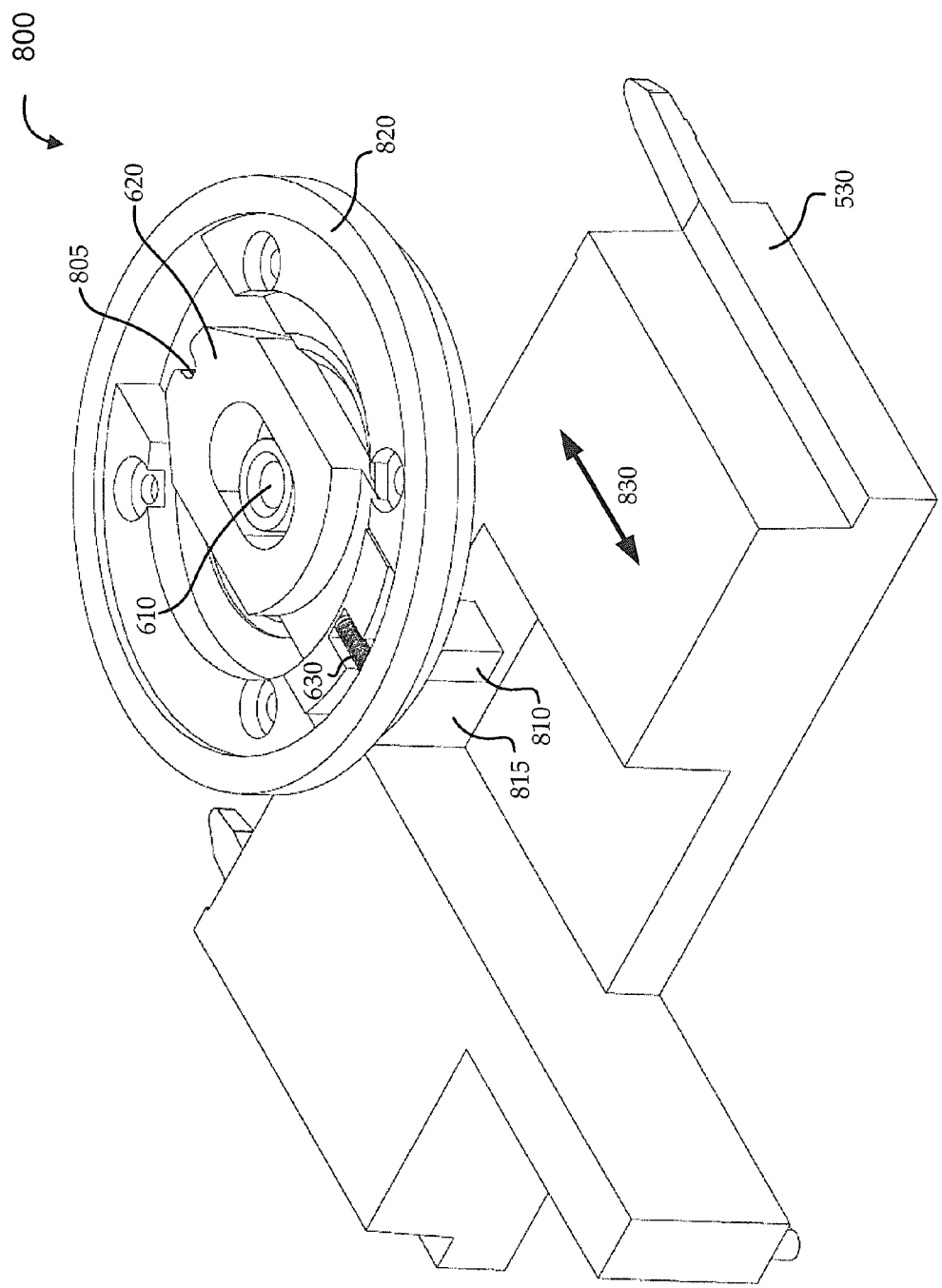
FIG. 8 shows a partial view of components of an illustrative hand assembly 420 to illustrate certain functionality, according to various embodiments.

FIG. 8 shows a partial view 800 of components of an illustrative hand assembly 420 to illustrate certain functionality, according to various embodiments. In particular, components of an illustrative wrist lock assembly 520 are shown in context of a simplified grip mechanism 530 and a portion of an illustrative wrist drive assembly 510. A latch 620 of the wrist lock assembly 520 is disposed within a bushing 820 of the wrist drive assembly 510 in such a way that the wrist drive assembly 510 can rotate the hand assembly 420 about axis 610 substantially without interference when the wrist lock assembly 520 is in an unlocked state.

The latch 620 includes or is in mechanical communication with a latch contact feature 810. For example, the latch 620 component may be shaped to have a post protruding in the direction of the grip mechanism 530. The grip mechanism 530 includes a grip contact feature 815 configured (e.g., located, shaped, etc.) to come in contact with the latch contact feature 810 when the grip mechanism 530 is in a certain position. As illustrated, the grip mechanism 530 is configured to move in the direction of arrow 830. For example, this causes finger-like components of the grip mechanism 530 to be extended or retracted.

In the embodiment shown, when the grip mechanism 530 is retracted, the grip contact feature 815 comes in contact with the latch contact feature 810. As the grip mechanism 530 continues to retract, the grip contact feature 815 pushes on the latch contact feature 810, thereby pushing the latch 620 into its preloaded position (i.e., its unlocked position) against the force of the tensioner 630 (e.g., a spring). When the grip mechanism 530 is extended, the grip contact feature 815 ceases pushing on the latch contact feature 810. This allows force from the tensioner 630 to be applied to the latch 620, thereby forcing the latch into its locked position. As described above, the latch 620 includes an interface feature 805 configured to interface with a locking feature. For example, the interface feature 805 is a notch shaped to interface with (e.g., partially surround) one or more alignment pins 625 (not shown).

In some embodiments, the interface feature 805 is shaped for additional functionality. For example, the opening to the interface feature 805 may be rounded, beveled, or otherwise shaped to allow the interface feature 805 to properly lock with the locking feature(s) even when the actual wrist angle is slightly different from the expected wrist angle (e.g., due to accumulated tolerances). Some implementations exploit information that can be derived from the locking of the wrist mechanism 435. For example, accurate knowledge of the wrist angle when in the locked state can be used to recalibrate one or more components, for example, of the wrist mechanism 435. In this way, wrist locking functionality can be used both to provide reliable operation in context of accumulated tolerances and to provide a manner by which to remove or limit those accumulated tolerances.

FIGS. 9A and 9B show two side views 900 of the wrist lock assembly 520 described above with reference to FIGS. 6A-8, according to various embodiments. As illustrated, a hand assembly 420 is suspended from a wrist mechanism 435 integrated into a Z-platform assembly 410 (e.g., as part of an X-drive assembly 415) in such a way that the hand assembly 420 can be rotated about axis 610. The hand assembly 420 includes a grip mechanism 530 configured to move in the direction of arrow 850. As described above with reference to FIG. 8, the grip mechanism 530 includes a grip contact feature 815 configured to come in contact with and to push a latch contact feature 810 when the grip mechanism 530 is retracted.

The latch contact feature 810 is in mechanical communication with a latch 620. The latch is coupled with a tensioner 630 that maintains a force pushing in a direction substantially opposite that of arrow 850. In some implementations, the wrist mechanism 435 includes a plate 705 configured to remain in a particular orientation even as other components of the wrist mechanism 435 and the hand assembly 420 rotate. For example, the plate 705 is coupled with the X-drive assembly 415 (not shown) in such a way that its orientation is substantially fixed. The plate 705 includes or is coupled with one or more alignment pins 625. Because the orientation of the plate 705 is substantially fixed, the orientation of the one or more alignment pins 625 may be similarly fixed.

In the configuration shown in FIG. 9A, the grip contact feature 815 is not pushing against the latch contact feature 810. Instead, force from the tensioner 630 is causing the latch 622 be held in a position in which an interface feature of the latch 620 is locked with one of the alignment pins 625. For example, in the highlighted region 910, and interface feature of the latch 620 is locked with alignment pin 625a. In this locked state, the wrist angle is locked, and the wrist mechanism 435 is presented from rotating the hand assembly 420.

FIG. 9B shows an identical configuration to the one described above with reference to FIG. 9A, but with the wrist lock assembly 520 in an unlocked state. The grip mechanism 530 has been moved in the direction of arrow 850 of FIG. 9A (e.g., retracted) until the grip contact feature 815 is pushing against the latch contact feature 810. This pushing provides enough force to overcome the force being applied by the tensioner 630, such that the latch 620 is moved in the direction of arrow 850 into its preloaded (i.e., unlocked) position.

As illustrated in highlighted region 915, the interface feature of the latch 620 is out of contact with alignment pin 625a. In some implementations, further features ensure that the latch 620 is also out of contact with other alignment pins, such as alignment pin 625b. In this unlocked state, the wrist mechanism 435 is allowed to rotate the hand assembly 420, for example, causing the grip mechanism 530 to point in another direction.

While FIG. 6A-9B focus on a single type of implementation, it will be appreciated that there may be many other ways to perform the functionality of embodiments described herein without departing from the scope of those embodiments. Accordingly, the specific types, shapes, arrangements, etc. of components described above are intended only to provide clarity and should not be construed as limiting the scope of other embodiments. For example, the tensioner 632 and grip mechanism 530 can be designed so that the latch 620 is in its preloaded position when in a locked state, rather than when in an unlocked state. Further, components shown as being directly in contact may alternatively be designed to be in contact via one or more intermediate components; or components shown as separate may alternatively be designed in some cases as a single component. Even further, locking features (e.g., alignment pins 625) can be provided in various numbers, positions, etc. to allow the wrist mechanism 435 to be locked in any particular desired way. Still further, the latch 620 can be configured to move and/or interface with the locking features in any useful way. For example, instead of the latch 620 sliding along a straight path as illustrated in various figures above, the latch 620 may rotate to open or closed positions about a fixed axis, swing open or closed in the manner of one or more doors, slide along a non-linear axis, etc.

Figure 10:
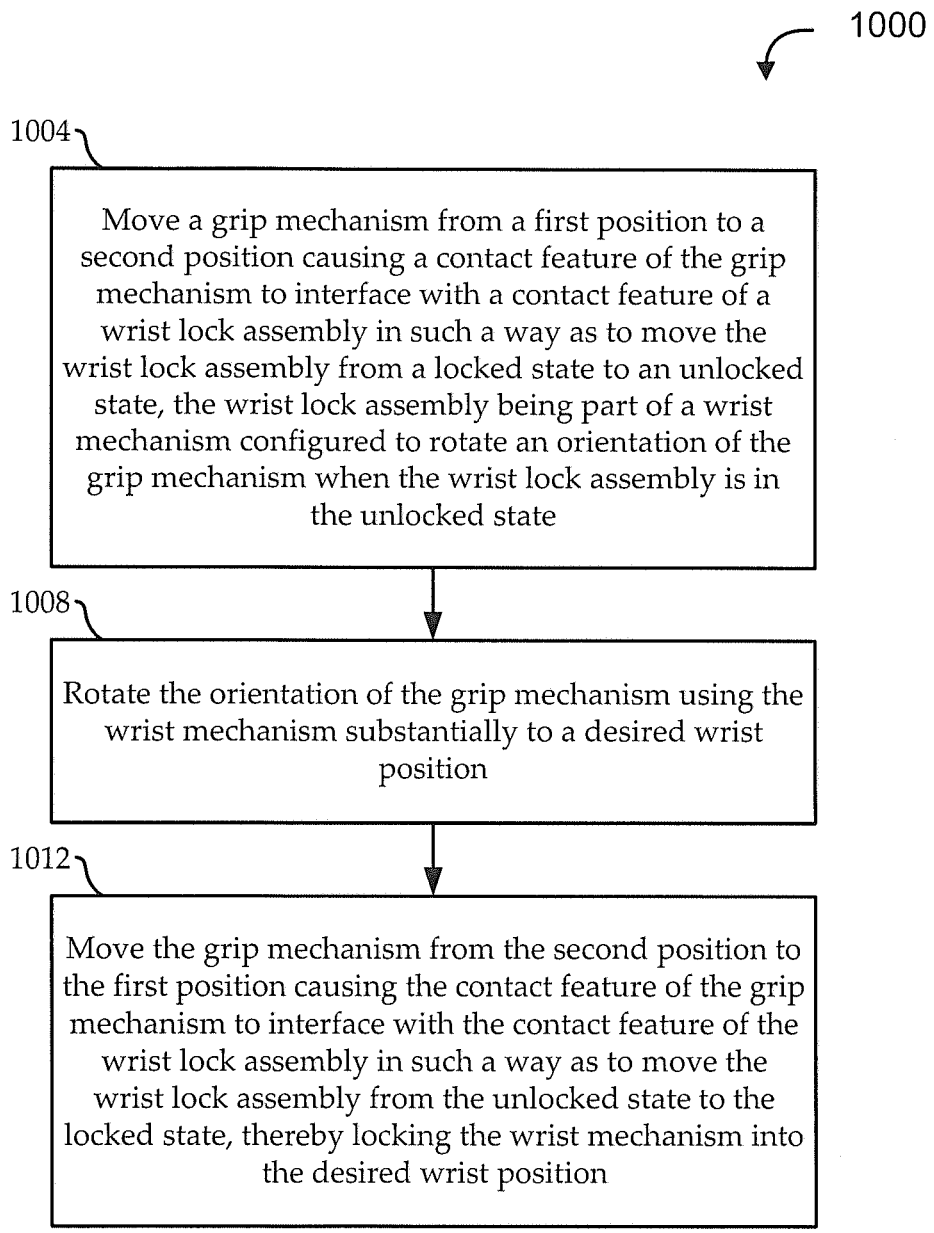
FIG. 10 shows a flow diagram of an illustrative method for using wrist locking techniques to lock the wrist angle of a wrist mechanism, according to various embodiments.

FIG. 10 shows a flow diagram of an illustrative method 1000 for using wrist locking techniques to lock the wrist angle of a wrist mechanism, according to various embodiments. It will be appreciated that various types of systems and components can be used to implement functionality of various method stages. As such, references to any components that are described above in the context of particular system embodiments are intended only to provide illustrative implementations for added clarity, and should not be construed as limiting the scope of method stages.

Embodiments of the method 1000 begin at stage 1004 by moving a grip mechanism from a first position to a second position. Movement of the grip mechanism causes a grip contact feature to interface with a latch contact feature that is coupled with a latch of a wrist lock assembly in such a way as to move from a locked state to an unlocked state. In one implementation, the grip contact feature is moved in such a way as to push against the latch contact feature, causing the latch to move into a preloaded position under tension applied by a tensioner. In another implementation, the grip contact feature couples with the latch contact feature in such a way as to move (e.g. push, pull, slide, roll, etc.) the latch into its unlocked position. The wrist lock assembly is part of a wrist mechanism configured to rotate and orient the grip mechanism about an axis when the wrist lock assembly is in the unlocked state. For example, the wrist mechanism is coupled with the hand assembly that includes the grip mechanism, and the wrist mechanism can be used to rotate the hand assembly thereby pointing the grip mechanism in a desired direction.

At stage 1008, the orientation of the grip mechanism is rotated about the axis using the wrist mechanism substantially to a desired wrist position. As described above, though it is desired to move the wrist mechanism to a precise wrist position (e.g., wrist angle), the precision may be impacted by accumulated tolerances due, for example, to gear backlash, axle clearances, skipped motor steps, etc. Accordingly, the wrist mechanism may be moved substantially to the desired wrist position, even if not precisely to the desired wrist position. Notably, implementations may allow the wrist mechanism to turn in one or more directions, in a smooth or stepwise manner, over any number of degrees (e.g. within a 180° range, etc.), about one or more axes, etc.

At stage 1012, the grip mechanism is moved from the second position to the first position. This may cause the grip contact feature to interface with the latch contact feature in such a way as to move the wrist lock assembly from the unlocked state to the locked state. In one implementation, the grip contact feature is moved out of contact with the latch contact feature, thereby allowing the tension applied by the tensioner to force the latch into a locked position. In another implementation, the grip contact feature couples with the latch contact feature in such a way as to move the latch into its locked position.

When the wrist lock assembly moves into the locked state at stage 1012, it locks the wrist mechanism into an accurate, predetermined position (e.g., wrist angle). As described above, the wrist lock assembly can include a latch that has an interface feature configured to interface with a locking feature secured in a predetermined location. The interface feature may include a notch, or the like, which may be designed to account for certain accumulated tolerances. For example, if the actual position of the wrist mechanism is not precisely the desired wrist position (e.g., due to component errors), coupling of the interface feature with the locking feature may cause the wrist mechanism to effectively snap into the accurate, predetermined position that is desired.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A wrist locking system for a robotic hand assembly grip mechanism, the system comprising:
   a grip mechanism configured to be moved between a first state and a second state;
   a wrist mechanism configured to rotate the grip mechanism, about a rotation axis passing through the wrist mechanism, to point substantially in a desired direction;
   an alignment feature; and
   a latch configured to be selectively interlocked with the alignment feature and in mechanical communication with the grip mechanism and the wrist mechanism in such a way that moving the grip mechanism to the first state mechanically causes the latch to transition to a locked state thereby interlocking the latch with the alignment feature so as to substantially prevent the wrist mechanism from rotating and so as to lock the grip mechanism in the desired direction, and moving the grip mechanism to the second state mechanically causes the latch to transition to an unlocked state thereby releasing the latch from the alignment feature so as to free the wrist mechanism to rotate the grip mechanism away from the desired location,
   wherein, in the first state of the grip mechanism, a pair of components of the grip mechanism used to grab and release a tape cartridge are in an extended position with ends of the components at a first distance from the rotation axis and, in the second state of the grip mechanism, the pair of components are in a retracted position with the ends of the components at a second distance from the rotation axis less than the first distance and
   wherein, in the first state of the grip mechanism, the components are spaced apart a third distance to facilitate grabbing a tape cartridge and, in the second state of the grip mechanism, the components are spaced apart a fourth distance greater than the third distance to facilitate releasing a tape cartridge.

2. The wrist locking system of claim 1, wherein:
   the latch comprises a latch contact feature; and
   the grip mechanism comprises a grip contact feature configured to interface with the latch contact feature in such a way as to move the latch between the locked state and the unlocked state when the grip mechanism moves between the first state and the second state.

3. The wrist locking system of claim 2, wherein the grip contact feature is configured to interface with the latch contact feature in such a way as to push and/or pull the latch between the locked state and the unlocked state when the grip mechanism moves between the first state and the second state.

4. The wrist locking system of claim 2, further comprising:
   a tensioner coupled with the latch and configured to exert a force against the latch to hold the latch in one of the locked state or the unlocked state,
   wherein the grip contact feature is configured to interface with the latch contact feature in such a way as to push the latch to the other of the locked state or the unlocked state by overcoming the force of the tensioner.

5. The wrist locking system of claim 1, wherein the alignment feature is one of a plurality of alignment pins each positioned according to a respective one of a plurality of desired positions.

6. The wrist locking system of claim 1, wherein:
   the wrist mechanism is configured to rotate the grip mechanism to change the orientation of the grip mechanism with reference to a structural framework;
   the wrist mechanism comprises the alignment feature and is configured to maintain the alignment feature in a fixed orientation with reference to the structural framework regardless of the orientation of the grip mechanism; and
   the wrist mechanism comprises the latch and is configured to rotate along with the grip mechanism, thereby maintaining the latch in a substantially fixed orientation with reference to the orientation of the grip mechanism.

7. The wrist locking system of claim 1, wherein the latch moves from the locked state to the unlocked state by sliding along a substantially linear path.

8. The wrist locking system of claim 1, wherein the latch moves from the locked state to the unlocked state by traveling in a substantially arcuate path.

9. A system comprising:
a structural framework;
a transport assembly coupled with the structural framework and configured to transport a mounting to a desired X-Z position with reference to the structural framework; and
a hand assembly comprising a wrist mechanism configured to rotatably couple the hand assembly to the mounting and comprising a grip mechanism configured to transition between a first state and a second state, the wrist mechanism comprising:
a wrist driver configured to rotate the grip mechanism to point substantially in a desired direction;
a first locking feature configured to remain in a substantially fixed orientation with reference to the structural framework regardless of the orientation of the grip mechanism;
a second locking feature configured to rotate in accordance with rotating the grip mechanism, to selectively interlock with the first locking feature, and to interface with the grip mechanism in such a way that transitioning the grip mechanism to the first state mechanically causes the second locking feature to interlock with the first locking feature so as to lock the grip mechanism in the desired direction, and in such a way that moving the grip mechanism to the second state mechanically causes the latch to transition to an unlocked state thereby releasing the second locking feature from the first locking feature thereby freeing the wrist driver to rotate the grip mechanism; and
a tensioner coupled with the second locking feature and configured to exert a force that holds the second locking feature in an unloaded position, the unloaded position being one of a locked position in which the second locking feature is interlocked with the first locking feature or an unlocked position in which the second locking feature is not interlocked with the first locking feature, wherein the second locking feature is configured to interface with the grip mechanism in such a way that transitioning the grip mechanism in a first direction mechanically forces the second locking feature into a preloaded position in opposition to the force exerted by the tensioner, and transitioning the grip mechanism in a second direction mechanically frees the second locking feature to move to the unloaded position under the force exerted by the tensioner, the preloaded position being the other of the locked position or the unlocked position.

* * * * *

UNITED STATES PATENT AND TRADEMARK OFFICE
CERTIFICATE OF CORRECTION

| | | |
|---|---|---|
| PATENT NO. | : 9,044,864 B2 | Page 1 of 1 |
| APPLICATION NO. | : 13/424175 | |
| DATED | : June 2, 2015 | |
| INVENTOR(S) | : Manes | |

It is certified that error appears in the above-identified patent and that said Letters Patent is hereby corrected as shown below:

In the specification

Column 1, line 21, delete "(IO)" and insert -- (I/O) --, therefor.

Column 5, line 48, delete "and or" and insert -- and/or --, therefor.

Column 6, line 31, delete "10" and insert -- I/O --, therefor.

Column 6, line 41, delete "and or" and insert -- and/or --, therefor.

Column 11, line 30, delete "refracted" and insert -- retracted --, therefor.

In the claims

Column 17, line 8, Claim 8, delete "arcuate" and insert -- accurate --, therefor.

Signed and Sealed this
Ninth Day of February, 2016

Michelle K. Lee
*Director of the United States Patent and Trademark Office*